United States Patent
Meyer et al.

(10) Patent No.: US 6,611,495 B1
(45) Date of Patent: Aug. 26, 2003

(54) SYSTEM AND METHOD FOR IMPROVED DATA TRANSFER IN PACKET-SWITCHED COMMUNICATION NETWORKS

(75) Inventors: Michael Meyer, Aachen (DE); Reiner Ludwig, Düren (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/326,952

(22) Filed: Jun. 7, 1999

Related U.S. Application Data

(60) Provisional application No. 60/121,086, filed on Feb. 22, 1999.

(51) Int. Cl.[7] .............. H04L 12/06; H04L 1/00; G01R 31/08; H04J 1/16
(52) U.S. Cl. .............. 370/230.1; 370/231; 714/749
(58) Field of Search .............. 370/230, 231, 370/232, 233, 234, 235, 252, 254, 519; 714/748, 749, 750

(56) References Cited

U.S. PATENT DOCUMENTS

| | | | |
|---|---|---|---|
| 5,442,637 A | * | 8/1995 | Nguyen .............. 371/5.5 |
| 5,748,901 A | | 5/1998 | Afek et al. |
| 5,793,768 A | | 8/1998 | Keshav |
| 5,802,106 A | | 9/1998 | Packer |
| 5,815,516 A | | 9/1998 | Aaker et al. |
| 5,931,916 A | * | 8/1999 | Barker et al. .............. 709/239 |
| 6,076,114 A | * | 6/2000 | Wesley .............. 709/235 |
| 6,118,765 A | * | 9/2000 | Phillips .............. 370/235 |
| 6,201,791 B1 | * | 3/2001 | Bournas .............. 370/234 |
| 6,405,236 B1 | * | 6/2002 | Nieratschker .............. 709/200 |
| 2002/0031088 A1 | * | 3/2002 | Packer .............. 370/231 |

OTHER PUBLICATIONS

Hedrick, Charles L., "General description of the TCP/IP protocols" in Introduction to the Internet Protocols, Rutgers University, Copyright (c) 1987, Charles L. Hedrick.

Samaraweera, N. et al, "Explicit Loss Indication and Accurate RTO Estimation for TCP Error Recovery Using Satellite Links" IEE Proceedings: Communications, p. 47, para. 1; p. 48, para.3.

Tamura Y et al, "EFR: a retransmit scheme for TCP in wireless LANs" Proceedings 23rd Annual. Conf. On Local Computer Networks. LCN'98 (Cat. No. 98TB100260) p. 3 para. 4; p 7, para. 1.

Tannebaum, Andrew S., "Computer Networks" 1996, Prentice Hall Ptr, New Jersey, p. 539, para. 3; p. 541, para. 5.

* cited by examiner

*Primary Examiner*—Steven Nguyen
*Assistant Examiner*—Duc Duong

(57) ABSTRACT

A method and apparatus for improving the data transfer rate of packet-switched networks that employ retransmission timers is disclosed. Upon receipt by a sender of an acknowledgment message indicating that the intended recipient received a data packet, a retransmission timer is initialized with a value that compensates for the time lag between the transmission of a data packet by the sender and the receipt of an acknowledgment message. A communication network includes data transfer terminals that, upon receipt by a sender of an acknowledgment message indicating that the intended recipient received a data packet, initialize a retransmission timer with a value that compensates for the time lag between the transmission of a data packet by the sender and the receipt of an acknowledgment message.

23 Claims, 4 Drawing Sheets

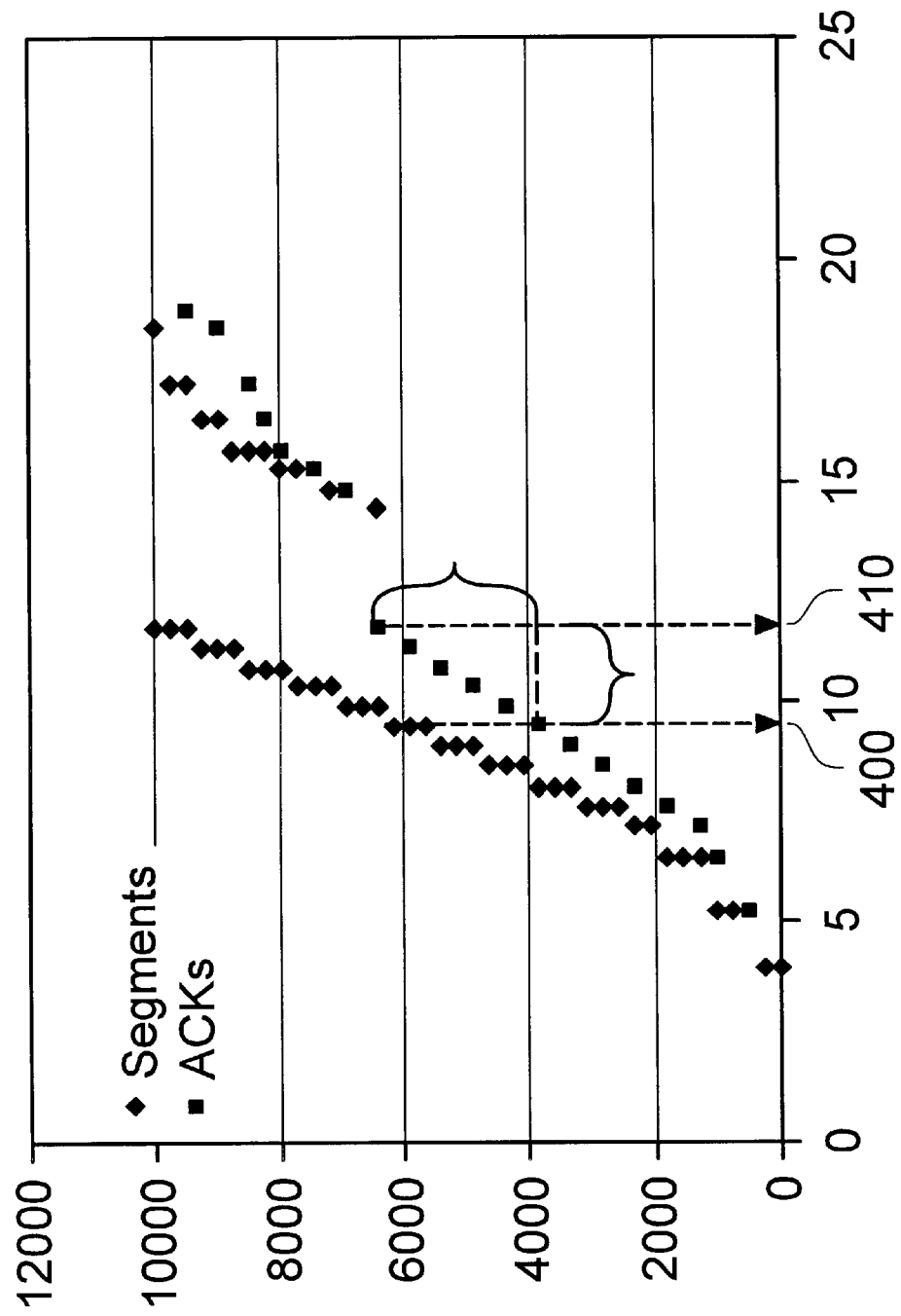

SYSTEM AND METHOD FOR IMPROVED DATA TRANSFER IN PACKET-SWITCHED COMMUNICATION NETWORKS

This application claims the benefit of provisional application No. 60/121,086 filed Feb. 22, 1999.

BACKGROUND

The present invention relates to systems and methods for data transfer in packet-switched communication networks. More particularly, the present invention relates to systems and methods for improving the data transfer rate in packet-switched communication networks.

Communication networks can be classified as either circuit-switched or packet-switched networks. Circuit-switched networks, traditionally used in voice communication networks such as telephone networks, operate by establishing a logical connection between two points on the network. Typically the connection is of a fixed bandwidth or capacity regardless of the desired data transfer rate of the sender. Circuit-switched networks are widely regarded as being inflexible in their operation and inefficient in their allocation of bandwidth, or capacity, throughout the network. By contrast, packet-switched networks, traditionally used in data communications, operate by carving information into packets, which are then sent across the network to a desired recipient node. Packet-switched networks may be connection-oriented, such that a logical connection is maintained between the sender and the receiver, or connectionless, such that no logical connection is maintained between a sender and a receiver on the network. Packet-switched networks are widely regarded as being more flexible and substantially more efficient in allocating bandwidth than circuit-switched networks. Due in part to these factors, demand for packet-switched network services has grown dramatically over the past two decades. It is anticipated that demand for packet-switched networks will continue its dramatic growth.

Packet-switched data networks are designed and based on industry-wide data standards such as the open system interface (OSI) model or an implementation of the Transmission Control Protocol/Internet Protocol (TCP/IP) stack. According to the OSI model, a network system is typically represented by a multi-layered protocol stack. The TCP/IP protocols are commonly modeled as a four-layer protocol stack. Layer 1, referred to as the link, data link, or network interface layer, manages the interfaces and device drivers for interfacing with the physical elements of the network. Layer 2, referred to as the network layer or the internet layer, is responsible for routing data packets on the network. The Internet Protocol (IP) is a network layer protocol. Layer 3, referred to as the transport layer, is responsible for carving the data to be transmitted into appropriately sized packets for transmission across the network. The transport layer also manages error recovery and congestion control processes, acknowledging received packets and setting timeouts to ensure that transmitted data is received by the intended receiver. The Transmission Control Protocol (TCP) is a transport layer protocol. Layer 4, referred to as the application layer, is responsible for managing particular TCP/IP applications. Exemplary TCP/IP applications include SMTP for e-mail, FTP for file transfers, Telnet for remote login, etc.

The TCP/IP protocol suite is the primary communications protocol suite applicable to the transfer of digital information across multiple, connected computer networks like the internet. The operation of a network according to TCP/IP protocols may be explained, at a conceptual level, as follows: TCP applications pass data for transmission to processes at the transport layer. The transport layer receives data for transmission from an application such as, for example, e-mail, and carves the data into appropriately sized packets, referred to as segments. The transport layer then passes the data segments to a network layer protocol utility, which compiles data packets according to network layer protocols like IP, referred to as datagrams, and routes the datagrams across one or more networks to the intended receiver. The network layer, in turn, requests the services of link-layer protocol utilities to manage a particular physical medium such as, for example, an ethernet connection.

The IP enables a connectionless, unreliable delivery service that may be used by numerous transport-layer protocols, including TCP. The IP layer is connectionless in that the IP maintains no logical relationship between successive datagrams transmitted across the network. Each datagram is treated by the network as an individual piece of information. Thus, even though a large file transfer may require sending hundreds, even thousands of datagrams, the IP layer of the network is unaware during the transfer that the packets are related. Individual packets may be routed across different paths through the network and/or may arrive at the destination in any sequence. The IP is unreliable in that robust error recovery procedures are not implemented at the IP layer.

TCP is a connection-oriented protocol. At the TCP (transport) layer, a logical connection is established between a TCP sender and a TCP receiver. As discussed above, at the sender node the TCP layer is responsible for dividing data into appropriately-sized segments for transmission. At the receiver node the TCP layer is responsible for acknowledging received segments and for reassembling related segments. Additional functions implemented at the TCP layer include error recovery and congestion control. In broad terms, error recovery refers to the process of ensuring that packets transmitted by a sender were, at a minimum, received by the intended recipient. Error recovery may include additional algorithms to ensure that the recipient received the correct data.

TCP uses a retransmission function as one error recovery procedure. Pursuant to TCP, a TCP sender retransmits data packets for which an acknowledgment packet is not received within a predetermined time period. TCP maintains a retransmission timer (REXMT) to implement the error recovery procedure. For each acknowledgment (ACK) segment returned by the receiver, the sender reinitializes the REXMT with a retransmission timer value (RTO) that is a function of the round trip time (RTT). In many implementations of TCP, the RTT is continuously measured by the TCP sender. In alternate embodiments, the RTT may be updated based upon actual RTT measurements. Radio Link Protocol (RLP), a link-layer protocol for wireless communications also implements a retransmission timer-based error recovery procedure, similar to the routine implemented by TCP.

Although various implementations of the retransmission routine have been effective, they may unnecessarily reduce data transfer rates in the network. Thus, there is a need for improved systems and methods for data transfer in packet-switched networks, including TCP networks. The present invention uses new techniques for managing a REXMT that enhance the data transfer rate of a network.

SUMMARY

The present invention addresses these and other problems by providing improved systems and methods for implementing packet-switched data transport services. More particularly, the present invention provides a retransmission-based error recovery procedure that facilitates improved data transfer rates in comparison to known retransmission timer error recovery procedures. According to one aspect of the invention, the data transfer rate may be improved by reinitializing the retransmission timer with a value that compensates for the elapsed time since the transmission time of a previously transmitted packet from the sender to the receiver. Advantageously, the system allows error correction to be managed on a per-packet basis, yet requires only a single timer to be implemented, thereby saving computational expense.

The present invention further provides improvements in data transfer rates by reducing the probability of unnecessary timeouts at a sender node. More particularly, the present invention provides a method for recalculating a retransmission timer value that determines whether a TCP sender has enough transmitted, but unacknowledged, segments outstanding to trigger a fast retransmit routine. If so, the RTO is calculated to include a factor that is a function of the time required for the sender to receive a predetermined number of ACK segments from the receiver. Including this factor increases the probability that the REXMT includes sufficient time to enable the TCP sender to implement a fast retransmit routine, rather than a congestion control routine.

A method according to one aspect of the invention is implemented in a communication network that implements TCP connections between at least one sender node and at least one receiver node utilizing sliding-window flow control. The invention provides a method of performing retransmission timer based error recovery at a sender node comprising the steps of receiving an ACK segment from the receiver node and reinitializing the REXMT with a value that compensates for the elapsed time since the transmission time of a previously transmitted segment from the sender to the receiver. Preferably, the REXMT is reinitialized with a time value compensating for the time elapsed since the transmission of the oldest data packet buffered for retransmission by the sender.

Advantageously, the present invention is not protocol-specific. Accordingly, another aspect of the invention provides a method of operating a packet-switched communication network that implements logical connections between sender nodes and receiver nodes on the network. The sender nodes are configured to utilize sliding-window flow control and retransmission timer based error recovery. According to the invention, the network operates by establishing logical connections between sender nodes and respective receiver nodes on the network and initializing, for each logical connection, a retransmission timer with a retransmission timer value that is a function of network traffic parameters. Data packets are transmitted from the sender nodes to their respective receiver nodes on the network and acknowledgement packets are received from the respective receiver nodes. Upon receipt of each acknowledgement packet for new data, the retransmission timer associated with the connection between the sender and the receiver is reinitialized with a value corresponding to the retransmission timer value minus the elapsed time since the transmission time of a previously transmitted packet buffered in a memory associated with the sender for retransmission to the receiver, provided the sender has unacknowledged data buffered for retransmission.

In a further aspect, the invention provides a communications network element that implements TCP connections between at least one sender node and at least one receiver node utilizing sliding-window flow control and retransmission timer based error recovery. The network element includes an output module for transmitting data segments to a receiver node, an input module for receiving ACK segments from the receiver node, and logic, operating on a processor associated with the network element, for reinitializing the REXMT with a value that compensates for the elapsed time since the transmission time of a previously transmitted segment from the sender to the receiver. The logic may be implemented in software running on a general purpose processor associated with the network element or may be embedded in an application specific integrated circuit (ASIC).

These and other aspects of the invention provide for improved data transfer rates in packet-switched networks, particularly in nodes functioning as 'sender' nodes. Improved data transfer rates in sender nodes contribute to improved network performance.

BRIEF DESCRIPTION OF THE DRAWINGS

FIG. 4 is a graph illustrating aspects of a TCP/IP session.

DETAILED DESCRIPTION

The present invention will be explained with reference to the exemplary embodiments and examples depicted in the following text and the accompanying drawings. In particular, the present invention will be explained in the context of the TCP transport layer protocol, but it will be appreciated that the particular embodiments depicted herein are presented for purposes of demonstration and are not intended to be limiting. It will be appreciated that the present invention is applicable to any packet-exchange link layer protocol or transport layer protocol that uses sliding window flow-control in combination with REXMT based error recovery.

This disclosure was prepared for one of ordinary skill in the art of designing and developing packet-switched communication networks such as, for example, a telecommunication network engineer. A working knowledge of the TCP/IP protocol suite can be developed from the following documents, which are expressly incorporated herein by reference: W. R. Stevens, *TCP/IP Illustrated, Vol. 1*, Addison-Welsley, 1994; W. R. Stevens, *TCP/IP Illustrated, Vol. 2*, 1995; Jacobson, V. et. al, TCP Extensions for High Performance, Jacobson V., et al., 1997, Internet Draft-Network Working Group, 1997. Additionally, this document assumes a working knowledge of the Radio Link Protocol. A working knowledge of the Radio Link Protocol can be developed from the following document, which is incorporated herein by reference: ETSI, Radio Link Protocol for data and telemetric services on the mobile station-base station switching system interface and the Base Station System-Mobile Switching Center (BSS-MSC) interface, GSM Specification 04.22, Version 3.7.0, February, 1992.

Figure 1:
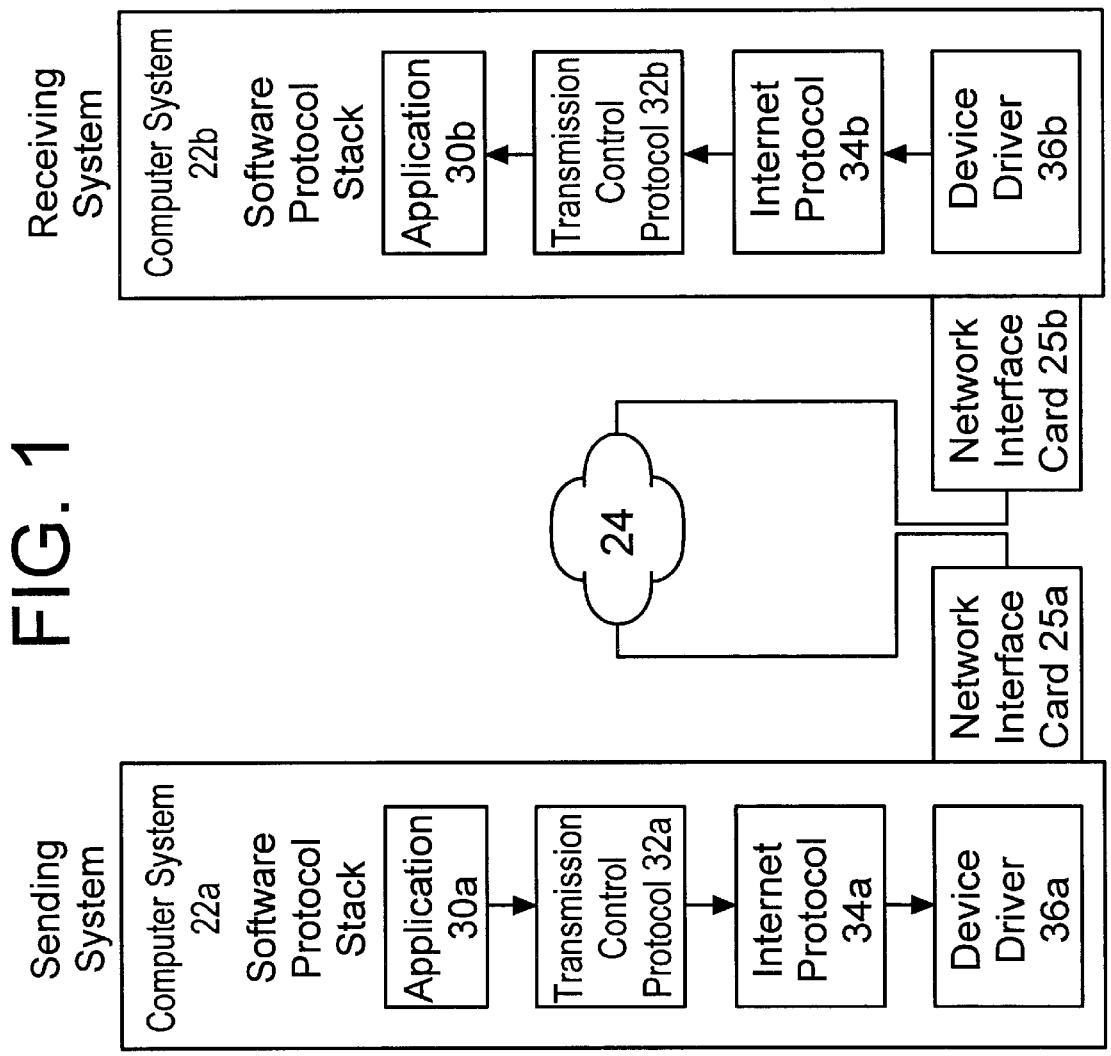
FIG. 1 is a schematic illustration of a TCP/IP network connection.

Referring to FIG. 1 there is shown a block diagram representation illustrating a packet communication network system generally designated by the reference character 20 which may be employed to implement the present invention. As shown, the packet communication system 20 includes a sending computer system 22a and a receiving computer system 22b, each connected to a packet communication network or internet 24 by respective network interface cards 25a, 25b. The sending and receiving computer systems, 22a, 22b include an operating system software protocol stack including application modules 30a, 30b, TCP modules 32a, 32b, IP modules 34a, 34b and device drivers 36a, 36b. An application 30a accesses the TCP module or utility 32a in the sending computer system 22a. TCP modules 32a, 32b call on the IP modules 34a, 34b which in turn call on device drivers 36a, 36b. TCP modules 32a, 32b may call on ther operating system functions, for example, to manage data structures. The interface to the network 24 is controlled by device driver modules 36a, 36b. In he receiving computer system 22b, the IP module 34b receives and reassembles a fragmented IP datagram from the device driver 36b and passes the IP datagram up to the TCP module 32b.

The present invention arises, in one aspect, from the recognition that error recovery procedures specified in the TCP may introduce unnecessary transmission delays that reduce the data transfer rate of a TCP sender node. A short background discussion of aspects of a communication session between a TCP sender and a TCP receiver, including error correction procedures, is in order.

As discussed above, a TCP connection is typically requested by a higher level application in the protocol stack. When the TCP layer receives a TCP connection request, a TCP module initiates a TCP session using the TCP's connection establishment protocol, frequently referred to as a "three-way handshake". After the TCP connection is established, the TCP sender begins transmitting data segments to the TCP receiver. The TCP protocol provides for sliding window flow control, pursuant to which a TCP sender may transmit more than one segment without receiving an acknowledgment. At least a portion of the segments transmitted without an acknowledgment are buffered in a memory location associated with the sender for retransmission in the event of an error.

A TCP receiver responds to the sender with cumulative, sequential ACK segments. The TCP receiver responds to the receipt of segment N with an ACK segment indicating that it is ready to receive segment N+1. By way of example, the TCP receiver acknowledges the receipt of segment number 1 with an ACK segment that indicates the receiver anticipates segment number 2 will arrive next. Similarly, the TCP receiver acknowledges the receipt of segment number 50 with an ACK segment that indicates the receiver anticipates segment number 51 will arrive next.

As discussed above, the TCP specifies a retransmission error recovery procedure. To implement this routine, logic operational at the sender's TCP layer maintains a REXMT for each connection between a TCP sender and a TCP receiver. In sliding window flow control implementations of TCP protocols, the REXMT is keyed to the "oldest" data segment buffered for retransmission by the sender. Pursuant to TCP, the REXMT is reinitialized with a RTO that is a function of the RTT each time an acknowledgment segment for new data is received by the sender, provided that the sender has unacknowledged data buffered for retransmission. In the event an error triggers a retransmission error recovery procedure, the sender reduces its, congestion window and after the expiration of the REXMT, retransmits the buffered data to the sender, beginning with the oldest outstanding segment buffered for retransmission.

Figure 2:
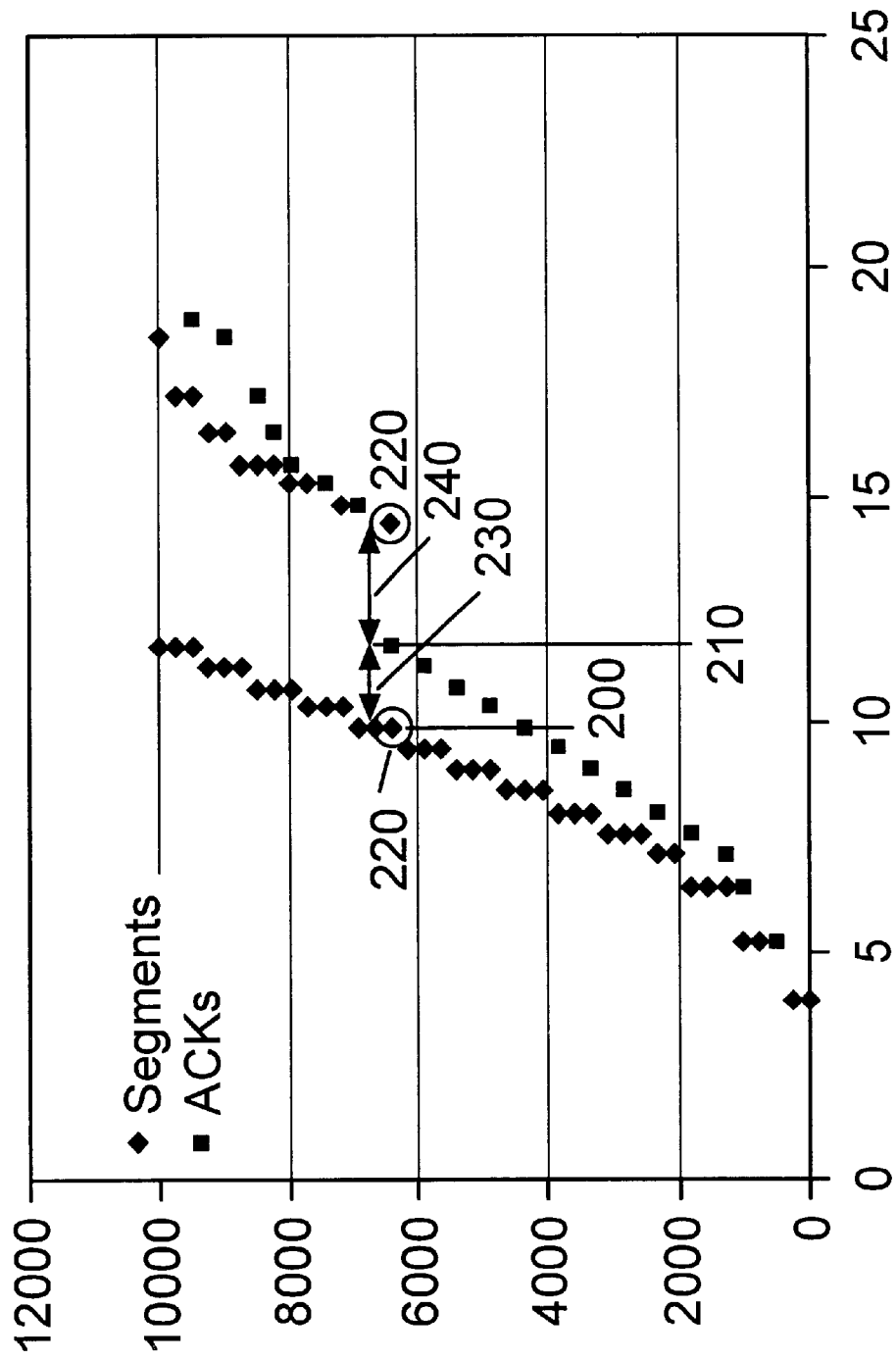
FIG. 2 is a graph illustrating aspects of a TCP/IP session.

FIG. 2 is a graph illustrating a TCP session from the perspective of a sender node on a network. Time (in seconds) is plotted on the horizontal or "X" axis and TCP sequence numbers are plotted on the vertical or "Y" axis. The transfer by the sender of TCP segments is plotted with diamonds and the receipt of ACK segments from the intended recipient is plotted with squares. Referring to FIG. 2 it is seen that a TCP session is initiated by the sender and two segments are transmitted approximately three seconds into the session. At approximately five seconds, the sender receives an ACK segment from the receiver acknowledging receipt of the second segment and transmits two more segments to the receiver node. At approximately six seconds the sender receives an ACK segment from the receiver and transmits three segments to the receiver, and the session continues normally. At approximately seven seconds the sender begins sending three segments each time data is transmitted. The TCP session depicted in FIG. 2 proceeds normally for the next few seconds. The sender is transmitting three segments per transmission to the receiver and receiving ACK segments from the receiver.

Several items should be noted in connection with FIG. 2. First, as the session progresses a time lag develops between the event of the sender transmitting information and the receipt by the sender of a corresponding ACK segment from the receiver. This time lag is evidenced by the divergence between the plots of segment transfers by the sender and the plots of ACK receipts by the sender. As the session approaches a steady state, and assuming a stable network, this time lag converges to approximate the RTT between the sender and the receiver. In one aspect, the present invention is based upon the recognition that this time lag introduces an error into the TCP REXMT, causing the REXMT to be too conservative. Second, it should be noted that the TCP sender implements sliding window flow control. Accordingly, the sender is allowed to transmit a predetermined number of segments that are unacknowledged. Third, it should be noted that, pursuant to TCP error-recovery procedures, the sender reinitializes its REXMT with a RTO upon receipt of each ACK segment for new data (e.g., excluding duplicate acknowledgment segments (DUPACKS), repeat ACK segments, and invalid ACK segments) provided the sender has unacknowledged data buffered for retransmission. The RTO timer value is typically calculated as a function of the RTT by logic instructions operating on a processor associated with the sender. In many TCP implementations the RTO converges to approximate the RTT in a steady state network.

Approximately twelve seconds into the session a network error occurs which triggers a retransmission error routine. An ACK segment 210 is received at approximately twelve seconds. Accordingly, the REXMT is reinitialized with the RTO 240 at approximately twelve seconds. It will be noted that approximately three seconds has lapsed since the transmission of the data that triggered the ACK segment 210. It will also be noted that, pursuant to sliding window flow control procedures, the sender has transmitted approximately fifteen segments that are unacknowledged. These segments are buffered in a memory associated with the sender for retransmission in the event of an error.

Due to a network error the sender does not receive an ACK segment from the receiver prior to the expiration of the REXMT, which occurs approximately fifteen seconds into the session. The particular network error that causes the REXMT to expire prior to receiving an ACK segment from the receiver is not critical to the present invention. The network error could be the result of network congestion that introduces excessive delay or a result of a failure in one or more nodes or links in the network between the sender and the receiver. The REXMT expires at approximately fifteen seconds, whereupon the sender initiates a retransmission error recovery procedure. Accordingly, pursuant to TCP, the sender reduces its transmission rate and begins retransmitting the unacknowledged segments, starting with "oldest" segment buffered for retransmission, indicated in the drawing by circles (e.g., segment 220). The sender retransmits the segments buffered for retransmission and the session is then able to continue normally.

The series of events presented in FIG. 2 illustrates a flaw inherent in the TCP retransmission error recovery procedure. Namely, initializing the REXMT with the RTO upon receipt of each acknowledgment segment fails to compensate for the time lag that develops between the event of the sender transmitting a segment and the receipt by the sender of a corresponding ACK segment from the receiver. At the time of the network error in the session depicted in FIG. 2, a time lag 230 of approximately three seconds exists between the transmission of data segment 220 and the receipt of a corresponding ACK segment 210. Time lag 230 introduces an unnecessary time delay into the retransmit error correction procedure. This time delay has a negative influence on the data transfer rate of the sender. In short, the REXMT is too conservative.

In one aspect, the present invention provides novel methods of reinitializing a TCP sender's REXMT to improve the data transfer rate of the TCP sender. According to the present invention, the REXMT is reinitialized with a value that compensates for the time that has elapsed since the sender transmitted a previous data segment to the receiver. In one embodiment of the invention, the REXMT, upon receipt of each ACK segment (excluding DUPACK segments, repeat acknowledgments, and invalid acknowledgments) is reinitialized with the RTO value minus the time that has elapsed since the "oldest" data segment the sender has buffered for retransmission. Reducing the REXMT by the time that has elapsed since the "oldest" data segment the sender has buffered for retransmission compensates for the time delay inherent in TCP's retransmission error recovery procedure, thereby increasing the data transfer rate of the TCP sender.

It will be appreciated that the RTO value could be reduced by an amount different from the elapsed time since the "oldest" segment the sender has buffered for retransmission to the receiver. This value represents an aggressive adjustment to the RTO. A less aggressive adjustment could be made by selecting a time less than the elapsed time since the "oldest" segment the sender has buffered for retransmission to the receiver. By way of example, the RTO could be reduced by the elapsed time since the transmission of a data segment transmitted more recently than the "oldest" buffered data segment.

Figure 3:
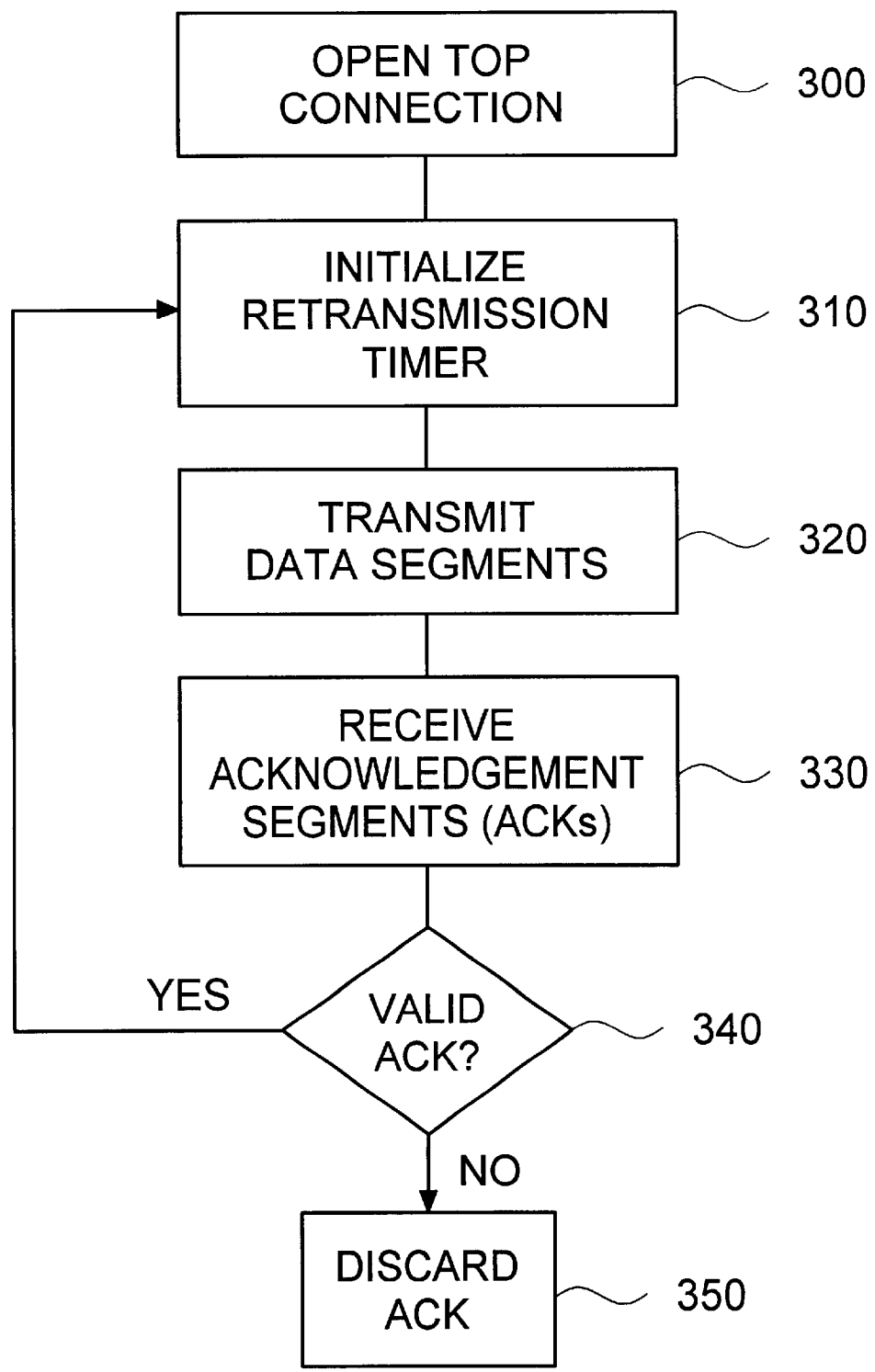
FIG. 3 is a flowchart illustrating one embodiment of an improved data transfer method according to the present invention.

FIG. 3 is a flow chart that illustrates a sequence of steps in managing a communication session between a TCP sender and a TCP receiver according to the present invention. Referring to FIG. 3, in step 300 the sender opens a TCP session between the sender and the receiver. This step may be performed in a manner that is consistent with existing TCP implementations. In step 310 the sender initializes the REXMT with the RTO minus the time elapsed since the "oldest" byte buffered for retransmission from the sender to the receiver. When the connection is first opened there are no segments buffered for retransmission so the REXMT is set to the RTO. TCP provides for initializing the REXMT at the beginning of a TCP session, and the REXMT may be initialized pursuant to existing protocols. At step 320 the sender transmits one or more data segments to the sender, depending upon the parameters of the start up procedure and the flow control procedures. This step also may be performed in a manner that is consistent with existing TCP implementations. In step 330 the sender receives an ACK segment from the receiver. In step 340 a test is performed to determine whether the ACK segment is valid and, if so, the REXMT is reinitialized with the RTO minus the time that has elapsed since the "oldest" segment buffered for retransmission. The REXMT is not reinitialized if the ACK segment is a DUPACK segment or an invalid ACK segment. Data transfer then proceeds pursuant to existing TCP implementations. If, during step 340, the ACK segment is determined to be in error, the ACK is discarded.

Operating a network supporting TCP sessions pursuant to the procedures illustrated in FIG. 3 enables TCP sender nodes to compensate for the delay inherent in the TCP retransmission error recovery procedure. Advantageously, the procedures illustrated in FIG. 3 do not impose extensive additional computation burdens on the network or require the collection and tracking of additional network statistics. Instead, the procedures illustrated in FIG. 3 utilize the RTO value, a statistic which is specified by TCP. Furthermore, the procedures illustrated in FIG. 3 enable the network to key the REXMT to an individual segment without incurring the computational expense of maintaining timers associated with each segment transmitted by a sender node.

In another aspect, the present invention provides novel procedures for calculating the RTO for a TCP connection to improve the data transfer rate of a TCP sender. According to the present invention, the RTO is calculated to increase the probability that a transmission error will trigger a fast retransmit/congestion avoidance routine, rather than a timeout routine. To implement this procedure, logic for calculating the RTO includes procedures for determining the amount of time required for the sender to receive a predetermined number of duplicate acknowledgment segments. According to the present invention, the logic may be implemented in the TCP layer. One embodiment of suitable logic is presented in the following C-like pseudocode:

if (U>N) then $RTO:=\text{Delta\_1}+\text{Delta\_3}+(P\times \text{Delta\_2})$;

else $RTO:=\text{Delta\_1}+\text{Delta\_2}$;

where:

U is the number of segments the sender has sent, but which are unacknowledged.

N is a number greater than or equal to K, which is the number of DUPACKS required for the TCP sender to trigger the fast retransmit/congestion avoidance mechanism. In most TCP implementations, K=3.

Delta_1 is a function of the RTT. A suitable function for Delta_1 is the Smoothed-RTT function as set forth in TCP/IP illustrated, Volume 1, incorporated by reference above. However, the Delta_1 function chosen is not critical to the present invention.

Delta_2 is a function of the variation in the round trip time. A suitable function for Delta_2 is the Smoothed-Mean-Variation function as set forth in TCP/IP illustrated, Volume 1, incorporated by reference above. However, the precise Delta_1 function chosen is not critical to the present invention;

Delta_3 is a function that compensates for the time required to receive the predetermined number of DUPACKS required to trigger a fast retransmit algorithm at the TCP sender; and P>=0. A suitable choice for P is to set P=K, the predetermined number of DUPACKS required for the TCP sender to trigger the fast retransmit/congestion avoidance mechanism.

Thus, according to the invention, logic for calculating the RTO tests to determine whether the sender has enough transmitted, but unacknowledged, segments outstanding to trigger a fast retransmission procedure. If this is the case, the RTO calculation includes a factor (e.g., Delta_3) that is a function of the amount of time required to receive a predetermined number of DUPACKS required to trigger the fast retransmit procedure. This factor enables the TCP sender to adjust the RTO to increase the probability of triggering a fast retransmit error recovery procedure, rather than a timeout error recovery procedure. Suitable functions for Delta_3 are presented below.

EXAMPLE 1

Determination of Delta_3

In a TCP network, the TCP sender can measure the number of segments (M) that were acknowledged during the most recent calculation of the round trip time. Referring to the TCP session illustrated in FIG. 4, the most recent round trip time is indicated as the time period elapsed between arrows 400 and 410. It can be seen that ten packets were transmitted and acknowledged during the indicated round trip time, thus M=10. Assuming that K is the number of duplicate acknowledgment segments required for the TCP sender to trigger a fast retransmit congestion avoidance mechanism and A is the latest round trip time measurement, Delta_3 may then be determined as follows:

$$\text{Delta\_3} = \text{Min}(A, ((A/M) \times K)))$$

EXAMPLE 2

Determination of Delta_3

Assume that B is a function of a time interval between the arrival of ACKs. B may be any suitable function including a suitable smoothing function. Suitable smoothing functions are disclosed in TCP/IP Illustrated, Vol. 1. Delta_3 may be determined as follows:

$$\text{Delta\_3} = \text{Min}(A, (B \times K))$$

Details of the present invention have been explained in the context of a TCP/IP network. However, the present invention is not limited to the TCP/IP suite. Principles of the present invention are applicable to any packet-switched network protocol that utilizes sliding window flow control and retransmission timer based error recovery procedures. By way of example, the present invention is fully applicable to the Radio Link Protocol specified in ETSI, Radio Link Protocol for Data and Telemetric Services on the Mobile Station-Base Station System (MS-BSS) Interface and the Base Station System-Switching Center (BSS-MSC) Interface, G.M. Specification 04.22, Version 3.7.0, February, 1992.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

We claim:

1. In a communication network that implements TCP connections between at least one sender node and at least one receiver node utilizing sliding-window flow control, a method of performing retransmission timer based error recovery at a sender node, comprising the steps of:
   (a) receiving an acknowledgement (ACK) segment from the receiver node;
   (b) determining a retransmission timer value (RTO) as a function of the time required for the sender node to receive a predetermined number of duplicate acknowledge segments from the receiver node; and
   (c) reinitializing a retransmission timer (REXMT) associated with a session between the sender node and the receiver node with said RTO.

2. A method according to claim 1, wherein step (b) further comprises:
   reinitializing the REXMT with a value that corresponds to the RTO minus the elapsed time between the transmission time of a previously transmitted segment from the sender node to the receiver node.

3. A method according to claim 2, wherein:
   the step of determining the RTO includes referencing a memory location associated with the sender node.

4. A method according to claim 2, wherein:
   the step of determining the RTO is performed by separate logic operating on a processor associated with the sender node.

5. A method according to claim 2, wherein:
   the RTO is determined as a function of the roundtrip time (RET) between the sender node and the receiver node.

6. A method according to claim 2, wherein:
   the RTO is determined as a function of the variation in the RTT between the sender node and the receiver node.

7. A method according to claim 2, wherein
   the RTO includes a component that is determined as a function of the RTT between the sender node and the receiver node and the variation in the RTT between the sender node and the receiver node; and
   if the number of unacknowledged segments transmitted by the sender node to the receiver node exceeds a predetermined number, then the RTO includes a component that is determined as a function of the time required to receive a predetermined number of said DUPACKS from the receiver node.

8. A method according to claim 1, further comprising the step of:
   repeating step b for each acknowledgment segment received from the receiver node.

9. A method according to claim 1, wherein step (c) further comprises reinitializing said REXMT with said RTO value less the time that has elapsed since the oldest data segment the sender has buffered for retransmission.

10. In a communication network that implements TCP connections between at least one sender node and at least one receiver node utilizing sliding-window flow control, a method of performing retransmission timer based error recovery at a sender node, comprising the steps of:
    (a) opening a TCP connection between the sender node and a receiver node;
    (b) initializing a retransmission timer (REXMT) with a predetermined retransmission timer value (RTO)
    (c) transmitting data segments from the sender node to the receiver node;
    (d) receiving acknowledgement (ACK) segments from the receiver node;

(e) upon receipt of each ACK segment from the receiver node, determining a (RTO) as a function of the time required for the sender node to receive a predetermined number of duplicate acknowledge segments (DUPACKS) from the receiver node; and (1) reinitializing said REXMT with said RTO.

11. A method according to claim 10, wherein step (f) further comprises reinitializing said REXMT with said RTO value less the time that has elapsed since the oldest data segment the sender has buffered for retransmission.

12. A method according to claim 10, wherein:

the step of determining the RTO includes referencing a memory location associated with the sender node.

13. A method according to claim 10, wherein:

the step of determining the RTO is performed by separate logic operating on a processor associated with the sender node.

14. A method according to claim 10, wherein:

the RTO is determined as a function of the retransmission timer (RTT) between the sender node and the receiver node.

15. A method according to claim 10, wherein:

the RTO is determined as a function of the variation in the RTT between the sender node and the receiver node.

16. A method according to claim 10, wherein the RTO includes a component that is determined as a function of the RTT between the sender node and the receiver node and the variation in the RTT between the sender node and the receiver node; and if the number of unacknowledged segments transmitted by the sender node to the receiver node exceeds a predetermined number, then the RTO includes a component that is determined as a function of the time required to receive a predetermined number of said DUPACKS from the receiver node.

17. A method of operating a packet-switched communications network that implements logical connections between sender nodes and receiver nodes on the network, wherein said sender nodes are configured to utilize sliding-window flow control and retransmission timer based error recovery, comprising the steps of:

(a) establishing logical connections between said sender nodes and respective receiver nodes on the network;

(b) initializing, for a logical connection, a retransmission timer with a retransmission timer value that is a function of network traffic parameters;

(c) transmitting data packets from sender nodes to respective receiver nodes on the network;

(d) receiving, at the sender nodes, acknowledgement packets from their, respective receiver nodes; and (e) upon receipt of an acknowledgement packet, reinitializing said retransmission timer (REXMT) with a retransmission timer value (RTO) that is determined as a function of the time required for the sender node to receive a predetermined number of duplicate acknowledge segments (DUPACKS) from the receiver node.

18. A method according to claim 17, wherein step (e) further comprises reinitializing said REXMT with said RTO value less the time that has elapsed since the oldest data segment the sender has buffered for retransmission.

19. A method according to claim 17, wherein:

the step of determining the RTO is performed by separate logic operating on a processor associated with a sender node.

20. A method according to claim 17, wherein the retransmission timer value includes a component that is determined as a function of the round trip time between the sender node and the receiver node and the variation in the round trip time between the sender node and the receiver node; and if a predetermined number of unacknowledged packets transmitted by the sender node to the receiver node is exceeded, then the retransmission timer value includes a component that is determined as a function of the time required to receive a predetermined number of duplicate acknowledgement packets from the receiver node.

21. A communications network element that implements TCP connections between at least one sender node and at least one receiver node utilizing sliding-window flow control and REXMT based error recovery, comprising:

(a) an output module for transmitting data segments to a receiver node;

(b) an input module for receiving acknowledgement (ACK) segments from the receiver node; and (c) logic, operating on a processor associated with the network element, for reinitializing said retransmission timer (REXMT) with a retransmission timer value (RTO) that is determined at a function of the time required for the sender node to receive a predetermined number of duplicate acknowledge segments (DUPACKS) from the receiver node.

22. A communications network sender node that implements TCP connections with at least one receiver node utilizing sliding-window flow control and retransmission timer based error recovery, comprising:

(a) means for opening a TCP connection between the sender node and a receiver node;

(b) means for initializing a REXMT with a predetermined RTO;

(c) means for transmitting data segments from the sender node to the receiver node;

(d) means for receiving ACK segments from the receiver node; and (e) means for reinitializing said retransmission timer (REXMT) with a retransmission timer value (RTO) that is determined as a function of the time required for the sender node to receive a predetermined number of duplicate acknowledge segments (DUPACKS) from the receiver node.

23. A sender node in a packet-switched communications network that implements logical connections between sender nodes and receiver nodes on the network, wherein sender nodes are configured to utilize sliding-window flow control and retransmission timer based error recovery, comprising:

(a) means for establishing logical connections between sender nodes and respective receiver nodes on the network;

(b) means for initializing, for a logical connection, a retransmission timer with a retransmission timer value that is a function of network traffic parameters;

(c) means for transmitting data packets from sender nodes to respective receiver nodes on the network;

(d) means for receiving, at the sender nodes, acknowledgment packets from their respective receiver nodes; and (e) means for reinitializing said retransmission timer (REXMT) with a retransmission timer value (RTO) that is determined as a function of the time required for the sender node to receive a predetermined number of duplicate acknowledge segments (DUPACKS) from the receiver node.

* * * * *